United States Patent Office 3,740,257
Patented June 19, 1973

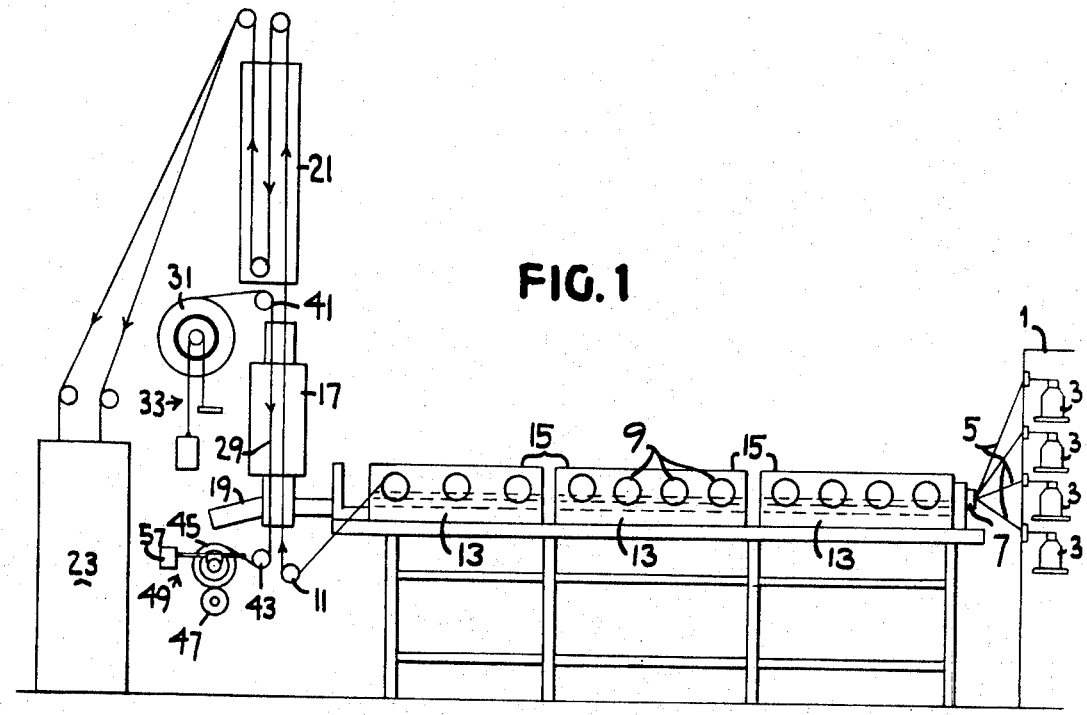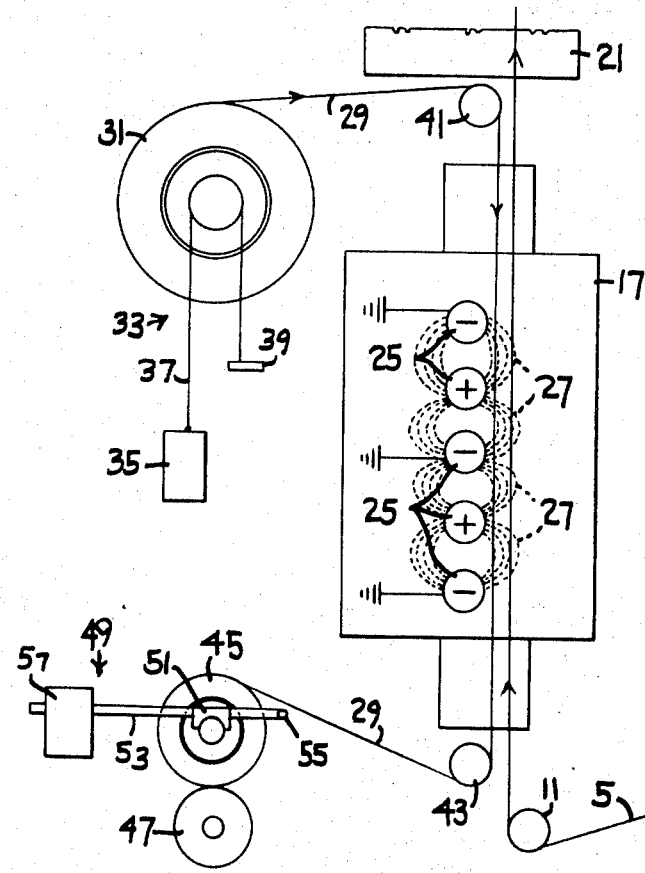

3,740,257
PROCESS AND APPARATUS FOR DIELECTRIC HEAT DRYING ELASTOMER COATED GLASS FIBERS
Alfred M. Roscher, Allison Park, Pa., assignor to PPG Industries, Inc., Pittsburgh, Pa.
Continuation of application Ser. No. 654,866, July 20, 1967. This application Sept. 21, 1971, Ser. No. 182,330
Int. Cl. F26b 3/34
U.S. Cl. 117—93.1 DH                    4 Claims

ABSTRACT OF THE DISCLOSURE

A method and apparatus for preventing particles of elastomer solids from being deposited on the electrodes of a dielectric heater during the process of dielectrically drying an aqueous elastomeric coating composition on strands of glass fibers. A barrier of glass cloth or the like is disposed between the elastomer coated glass fiber strands and the electrodes of the dielectric heater to preclude depositing particles of elastomer solids on the electrodes of the dielectric heater and to thereby preclude an "arc-out" of the dielectric drying process from occurring.

CROSS-REFERENCE TO RELATED APPLICATION

This application is a continuation of co-pending application Ser. No. 654,866, filed July 20, 1967 now abandoned.

BACKGROUND OF THE INVENTION

This invention relates to treated glass fibers and, more particularly, to glass fiber strand or yarn that has been coated with an elastomeric material for use as a reinforcement for elastomeric products, such as automotive tires, drive belts, conveyor belts, hosing and the like.

Specifically, the present invention provides an improved process and apparatus for manufacturing elastomer coated glass fiber strand, yarn, cord or fabric.

The desirability of the use of glass fibers to reinforce natural and synthetic elastomeric materials, such as nitrile rubber, SBR and neoprene rubber, is generally well-known. The principal advantages provided by the use of glass fibers as a reinforcement for rubber include: excellent tensile strength, which is unaffected by moisture and temperature up to about 600° F.; excellent dimensional stability; definite elongation characteristics; outstanding resistance to cold flow or yield under stress; and good aging characteristics. However, even though the above represents significant property advantages over existing rubber reinforcements, such as cotton, rayon, nylon and polyester, difficulty has been encountered in converting the glass fibers into a suitable reinforcement system for natural and synthetic elastomeric materials.

An advance in promoting the acceptance of glass fibers as a reinforcement system for rubber and the like was made when it was proposed that glass fiber strand first be coated with a coupling agent and, either simultaneously therewith or during a subsequent treatment, coated with an elastomeric material that is compatible with the elastomer which the glass fiber strand is intended to reinforce. However, while this treatment demonstrated that better utilization could be made of the properties of glass fibers as a reinforcement material, additional problems arose in connection with the processing techniques that were employed to produce elastomer coated glass fibers and, more particularly, elastomer coated glass fiber strands.

Among these additional problems were the difficulties that were encountered in drying coated glass fibers that were wet or saturated with the elastomeric dip while processing the glass fibers through a heated atmosphere over supporting and conveying elements. Thus, in one previously practiced process, the elastomer coating was initially provided by coating and impregnating the glass fibers with a solution or liquid dip containing the elastomer. The wet or saturated glass fibers were then supported and conveyed under slight tension over rollers or the like as they traversed through a heated atmosphere to dry the elastomer coating on the glass fibers.

Among the problems that arose in connection with the aforesaid processing technique were those of drying the elastomer coated glass fibers without stripping off coating material and/or depositing coating material on the conveying and supporting elements; of producing elastomer coated glass fibrous material that was not tacky and was therefore susceptible of being readily handled and processed by winding, twisting, plying or weaving operations into strand, yarn, cord, cable, fabric or the like; and of continuously producing elastomer coated glass fibrous products at a high rate of speed without the necessity of additional expenditures in processing steps, time and equipment to produce a desirable product.

As disclosed in applicant's copending application, Ser. No. 605,814, filed Dec. 29, 1966, entitled Manufacture of Elastomer Coated Glass Fibers, the foreoing problems can be avoided or substantially alleviated by employing high frequency electrical heating, such as dielectric heating, to dry coated glass fibers that are wet or saturated with elastomeric dip. As is set forth more fully in that application, the use of dielectric drying permits processing coated glass fibers over rolls, pulleys and the like without stripping off coating material and/or depositing coating material on supporting and conveying elements. Also, dielectric drying produces elastomer coated fibrous material that is not tacky and is therefore susceptible of being readily handled and processed by winding, twisting, plying or weaving operations into strand, yarn, cord, cable fabric or the like. Moreover, compared to conventional drying by hot air or radiant heat, dielectric drying provides improved uniformity of the coating on the glass fibers. This is evidenced by a uniformity of amounts and coloring of the coating, the absence of bubbles or pits on the coated glass fibers and the absence of "flags" or lumps of adhesive along the length of the coated glass fibers.

In addition, where it is desired or required to pass the coated glass fibers through a curing oven subsequent to drying, the dielectric drying permits faster production speeds for a given length of curing oven, the use of shorter curing ovens, and better process control than was the case with conventional drying and curing processes that do not utilize dielectric drying. Furthermore, elastomer coated strand can be processed five to six times faster through the curing oven when exposed first to dielectric drying than was possible when dielectric drying was not used.

While the foregoing disclosure of applicant's copending application represents a significant advancement in processing elastomer coated glass fibers, a further problem arose in connection with the process and apparatus employed for dielectric drying. This problem was the deposition and/or eventual build-up of elastomeric dip material on the electrodes of the dielectric heater after a period of continuous or prolonged use in the process of drying elastomer coated glass fibers. During the process of drying by dielectric heating and particularly when operating at high speeds, a relatively violent boiling or volatilizing off of undesired constituents of the dip occurs, such that very fine particles of the elastomer solids are driven off of the coated glass fibers and are "spattered" or deposited on the adjacent electrodes of the dielectric heater.

Under conditions of continuous or prolonged operation, the electrodes eventually become so heavily coated that they induce an "arc-out" of the dielectric process which necessitates down time for cleaning. "Arc-out" occurs as a result of dielectric breakdown or an insufficient electrical gap being present between the coated glass fibers that are wet or saturated with elastomeric dip and the electrodes of the dielectric heater. Short of "arc-out" occurring, it is, of course, necessary to maintain a regularly scheduled shut-down of the entire process for the purpose of cleaning the electrodes of the dielectric heater. Under either condition, there is a drastic reduction of over-all operating efficiency.

SUMMARY OF THE INVENTION

Briefly, the present invention provides a novel means and method for improving the over-all operating efficiency of a process employing high frequency electric heaters for the purpose of fixing, setting or drying a coating composition on fibrous material. More specifically, the present invention teaches the advantageous use of a non-metallic barrier between coated glass fibers that are wet or saturated with an aqueous elastomeric dip and the electrodes in a high-frequency electrical heating apparatus employed for the purpose of drying the elastomeric dip coating on the fibers.

Accordingly, it is an object of this invention to provide an improved process and apparatus for manufacturing elastomer coated fiber, strand, yarn, cord, cable, fabric or the like for reinforcement of rubber.

It is a further object of this invention to provide an improved process and apparatus for manufacturing rubber coated glass fiber products.

BRIEF DESCRIPTION OF THE DRAWINGS

The above and other objects and advantages of this invention will become more apparent when considered in connection with the accompanying drawings, wherein:

FIG. 1 is a diagrammatic representation of a typical flow process that may be employed in the practice of the invention;

FIG. 2 is a diagrammatic representation of one form of high frequency dielectric heating apparatus that may be employed in the practice of the invention.

DESCRIPTION OF THE PREFERRED EMBODIMENTS

Figure 3:
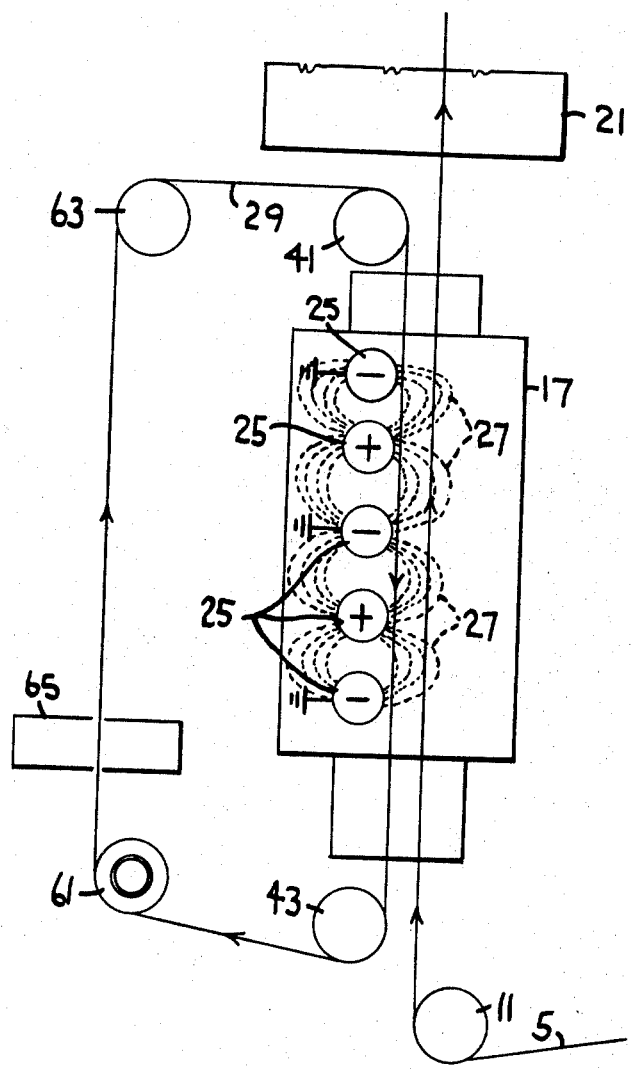
FIG. 3 is a diagrammatic representation of another form of high frequency dielectric heating apparatus that may be employed in the practice of the invention.

Referring to the drawings in detail, FIG. 1 shows a creel 1 having mounted thereon a plurality of bobbins 3 containing glass fiber strand 5. Each of the glass fiber strands 5 is coated with a sizing material comprising a lubricant, binder and coupling agent, such as disclosed in U.S. patent application Ser. No. 535,683, filed Mar. 21, 1966, and assigned to the assignee of the present invention. Other suitable size materials that contain suitable coupling agents may be found in U.S. patent applications Serial No. 599,180, filed Dec. 5, 1966, for Novel Reaction Product and Use Thereof as a Glass Fiber Size, by Charles W. Killmeyer and George E. Eilerman, and Ser. No. 601,341, filed Dec. 13, 1966, for Glass Fibers for Elastomer Reinforcement, by Joe B. Lovelace and David H. Griffiths. Furthermore, as is conventional, each of the glass fiber strands 5 has imparted therein a 0.5 turn per inch twist to provide strand integrity and resistance to fuzzing during initial handling or processing prior to being coated and impregnated with elastomeric material.

The strands 5 are combined in parallel relation and passed through a ceramic guide 7, in tangential contact across motor driven rotating rollers or dip applicators 9, to a motor driven rotating wiper roller or pulley 11. The rollers or dip applicators 9 are partially suspended in an aqueous rubber dip or emulsion 13 contained within vessels or tanks 15. The dip applicators 9 are driven counter to the direction of travel of the strands 5 to improve the coating and impregnation thereof. The pickup of rubber dip 13 by the applicators 9 and strands 5 is more than sufficient to coat and impregnate the strands with the desired final amount of rubber dip or adhesive material 13. The wiper roller or pulley 11 is driven counter to the direction of travel of the strands 5 and serves to further impregnate the strands while removing excess rubber dip or adhesive material 13.

From the wiper roller or pulley 11, the coated, impregnated strands are passed vertically through a dielectric heater or drying oven 17, wherein certain undesired volatile constituents of the rubber dip 13 are driven off and removed from the dielectric oven 17 by means of a blower 19. A suction device (not shown) could be used in lieu of or in addition to the blower 19 and would preferably be located adjacent the upper or exit end of vertically arranged dielectric oven 17. For reasons that will be explained more fully hereinafter, dielectric oven 17 is also provided with a movable barrier 29 disposed between the strands 5 and the electrodes 25. The construction of a typical dielectric heating or drying oven, suitable for use with the present invention, is shown more fully in FIG. 2.

Referring to FIG. 2, there is shown a diagrammatic representation of dielectric heater 17 comprising a vertically arranged series of spaced electrodes 25 electrically connected to a suitable power source (not shown) to produce an alternating, high frequency electrical field 27 between successive oppositely charged electrodes. Since the detailed construction and principle of operation of dielectric heaters does not, per se, form a part of the present invention, reference is made to U.S. Pats. Nos. 2,503,779 and 2,865,790 for these details. For a complete understanding of the present invention, it will be sufficient to point out that as strands 5, coated and impregnated with aqueous rubber dip 13, traverse across but not contacting the electrodes 25 and through fields 27, the liquid component of the dip, which has a higher dielectric constant than the solid component, is electrically activated to produce a uniform heating action throughout dip material 13. For the purpose of the present invention, the rate and amount of electrical activation or dielectric heating is controlled to the extent of removing or volatilizing substantially all of the liquid component of the aqueous dip material while leaving the solid component substantially unaffected. The coated and impregnated strands 5, as they leave dielectric heater 17, are free of bubbles and sufficiently dry and free of tack for the purpose of further processing the strand over rolls, pulleys or the like without fear of stripping off coating material and/or depositing coating material on supporting and conveying elements or the like.

Disposed between the strands 5 and the electrodes 25 is a movable barrier 29, the operation and function of which forms the basis of the present invention. As mentioned hereinabove, controlled electrical activation or dielectric heating of the coated strands 5 results in removing or volatilizing off undesired constituents of the elastomeric dip material. This drying or volatilizing off of dip material proceeds in a relatively rapid and violent manner such that particles of the elastomer solids are driven off of the coated glass fibers. Absent a means for removing these particles, elastomer solids are "spattered" or deposited on the adjacent electrodes 25 of the dielectric heater 17. Excessive build-up or deposit of elastomer solids on the electrodes eventually results in inducing "arc-out" or "short-circuiting" of the dielectric process, necessitating down time for cleaning.

Accordingly, there is employed in the practice of this invention a movable barrier 29 of non-metallic material that is stretched over or extends across the electrodes 25 to keep them clean. The barrier material may contact the electrodes 25, as long as it does not function to "short-circuit" electrodes of opposite polarity. Alternatively, the barrier material may only contact electrodes of one polarity or it may be spaced from all of the electrodes. Accordingly, it will be understood that the cleanliness function of the barrier material 29 does not result from contacting or wiping the electrodes 25, but rather from physically isolating the electrodes 25 from the strands 5.

The barrier material 29 is unwound from a supply roll 31 provided with suitable tensioning means 33, such as a free-hanging tension weight 35 fixed to one end of a belt or cord 37 that frictionally engages a pulley or the like mounted on the rotatable shaft of the supply roll 31. The belt or cord is secured at its end opposite that of the tension weight by means of a fixed anchor 39. The barrier material is passed across a roller 41 located adjacent the upper end of the vertically disposed dielectric heater 17, and then traverses or passes downwardly through the dielectric heater 17 and between the strands 5 and the electrodes 25. As the barrier material 29 exits from the lower end of the dielectric heater 17, it passes across roller 43 and then onto a take-up roll 45. The take-up roll 45 is driven by a drive roll 47, which in turn is driven by a constant speed motor (not shown). The take-up roll is also provided with a suitable brake means 49, such as a pressure block 51 that frictionally engages the rotable shaft of the take-up roll 45. As shown, pressure block 51 is mounted intermediate the ends of a lever arm 53 that is journaled at one end by means of a pivot 55 and has a weight 57 mounted on the other end. The specific details of the construction and operation of all of the foregoing transfer or conveying apparatus will be readily apparent to those skilled in the art, and forms no part of this invention.

The material used for the movable barrier is preferably glass cloth which has been coronized. However, other materials may be used, such as asbestos, cloth, Mylar, polypropylene, polyethylene or Teflon sheeting and wax paper. Coronized glass cloth is preferably used because it does not blister or expand when exposed to the environment within the dielectric heater 17. In the disclosed environment within the dielectric heater 17, the barrier material 29 will become contaminated with elastomer solids and will become hot. If the barrier material 29 is of a type that expands or blisters upon heating, it may contact the coated strand 5 and cause the dielectric heater 17 to "arc-out" or "short-circuit." "Arcing-out" is generally accompanied by burning holes in the barrier material. Since glass cloth does not blister and does not expand any appreciable amount when heated, it provides a very desirable material for use as the movable barrier. However, any suitable material may be used for this movable barrier that exhibits properties of low thermal expansion, high resistance to heat, low water absorption, non-burning and high arc resistance. Even rigid materials may be used. Of course, if it is desired to use rigid materials, a different barrier transfer mechanism than the one described above would be used.

Thereafter, the coated strands pass upwardly and then traverse through a hot gas oven 21 or other suitable heating device to cure or react the solid component of the adhesive 13, as will be explained more fully hereinafter. Following attainment of the desired degree of cure, the adhesive coated fiber glass strands are removed from the curing oven 21 and either collected on a suitable take-up device 23 or passed on for further processing.

Referring to FIG. 3, there is shown a diagrammatic representation of dielectric heater 17 provided with a movable barrier 29 that passes in a continuous loop through heater 17 and around rollers 41, 43, 61 and 63. As before, the barrier material 29 may be coronized glass cloth or any other suitable material that provides a physical barrier to passage of fine particles of elastomer solids but does not significantly interfere with or reduce the drying efficiency of the high frequency electrical fields 27. As illustrated, barrier material 29 passes over rollers 41, 43, 61 and 63 and is disposed between strands 5 and electrodes 25 as it passes through heater 17. One or more of the rollers 41, 43, 61 and 63 is preferably provided with suitable tensioning means (not shown) for the purpose of maintaining slight tension in the barrier material 29. Also, at least one of the rollers, such as roller 61, is preferably provided with a drive means (not shown), such as a constant speed motor.

As is further illustrated in FIG. 3, disposed across the path of travel of the barrier material 29 is a suitable barrier cleaning means 65 provided for the purpose of removing or disposing of a substantial amount or all of the elastomer solids that are deposited on barrier 29 during its passage through dielectric oven 17. In the case of coronized glass cloth being used as the barrier material, a suitable barrier cleaning means would comprise a burner, such as an open flame burner, that burns off the deposited particles of elastomer solids without, however, significantly degrading the strength of the glass cloth. As will be appreciated, the arrangement of FIG. 3 will greatly enhance the over-all operation of the disclosed process by permitting continuous use of the barrier material while effecting the continuous removal and disposal of particles of elastomer solids deposited on barrier material 29. It will also be appreciated that while the gist of the present invention is to provide a barrier, whether it be stationary or movable in an intermittent or continuous manner, removal of the elastomer solids deposited on the barrier material from the environment of the dielectric drying operation eventually becomes imperative. The foregoing arrangement of FIG. 3 illustrates one manner in which collection and removal, as well as disposal, of the elastomer solids can be accomplished efficiently while permitting continuous and uninterrupted use of the barrier 29.

EXAMPLE

A rubber adhesive was prepared from the following ingredients:

| Ingredients: | Parts by weight |
| --- | --- |
| Resorcinol | 352 |
| $CH_2O$ (37%) aqueous solution | 518 |
| NaOH | 9.6 |
| Butadiene-Styrene-Vinyl Pyridine Terpolymer Latex (Gen-Tac 41% solids dispersed in $H_2O$) | 7800 |
| $NH_4OH$ (28% $NH_3$ in $H_2O$) | 362 |
| $H_2O$ | 9572 |

These ingredients were mixed in the following manner. The Gen-Tac terpolymer latex was mixed with 1940 parts by weight of water. Water (7632 parts by weight) was added to a separate container. NaOH was then added and dissolved in the water in the separate container. Resorcinol was next added to the aqueous solution of NaOH and dissolved therein. Formaldehyde was added after the resorcinol and the mixture was stirred for 5 minutes and allowed to age at room temperature for two to six hours. The aging permits a small amount of condensation of resorcinol and formaldehyde and provides superior "H" test adhesion of the subsequently coated yarn to the rubber stock. The "H-Adhesion" test is a standard rubber industry test designated as ASTM–D–2138–62T issued in 1964. After aging, this mixture was added to the Gen-Tac latex and the resultant mixture was stirred slowly for 15 minutes. Ammonium hydroxide was then added and the mixture was stirred slowly for 10 minutes. The ammonium hydroxide inhibits further condensation of the resorcinol formaldehyde.

Sized glass fiber strands produced as described in U.S. patent application Ser. No. 535,683, supra, were coated and impregnated with the above adhesive, as described more fully hereinbelow.

Five strands (ECG-75's) with one-half turn per inch of twist were combined in parallel relation and passed under slight tension over rotating rollers 9 which were partially suspended in the adhesive 13. The pickup of adhesive dip was approximately 50-125% by weight of dip based on the weight of strands and was sufficient to provide a final coating on the strands of about 20 to 25 percent by weight of adhesive solids based upon the weight of strands. Above seven percent (7%) by weight of adhesive solids based on the weight of strands, and preferably above twelve percent (12%) by weight of adhesive solids based on the weight of strands, is normally required to produce the desired tensile strength for strand used in reinforcing mechanical rubber goods. Fifteen percent (15%) by weight of adhesive solids based on the weight of strands has been found to be suitable for most purposes.

The coated strands 5 were passed vertically through a 36-inch high dielectric drying over 17 to remove the water and $NH_3$ from the adhesive. Dielectric heater or drying oven 17 was operated at 4000-5000 volts between electrodes and a frequency of 27-30 megacycles. Unlike drying with conventional hot gas or radiant heating means, the strands, on leaving the dielectric heater, were free of bubbles and sufficiently dry and free of tack for further processing over rolls or the like without stripping off coating material and/or depositing coating material on the rolls.

Contemporaneously with passing the coated strands 5 through the dielectric oven 17, movable barrier 29 was also traversing dielectric oven 17 in a direction counter to the direction of movement of coated strands 5. The movable barrier was composed of coronized glass cloth that moved at a more or less constant speed of one inch per minute across and in contact with the electrodes 25. The glass cloth barrier was spaced approximately ½ inch to ⅝ inch from the coated strands 5. Due to the boiling or drying of the aqueous diluent of the elastomeric coating, elastomer solids were deposited on the movable barrier. The electrodes 25 disposed on the opposite side of the barrier from that of the coated strands 5 remained clean. Under the foregoing operating conditions, the coating and drying process proceeded continuously and without interruption.

The coated strands were next passed upwardly through a hot gas oven 21 maintained at a temperature of about 300° to 500° F. to effect curing of the resorcinol formaldehyde. The curing or condensing of the resorcinol formaldehyde is free to proceed with the removal of the $NH_3$. The condensation is time-temperature dependent. For example, heating the coated strands for 30 seconds at 370° F. or 20 seconds at 420° F. with the strands making several passes through oven 21 at a rate of speed of about 150-300 feet per minute is satisfactory. In any event, it has been found that for a given time-temperature relationship to effect curing of the resorcinol formaldehyde and for a given length of oven in which to accomplish the desired cure, the coated strands can be processed five to six times faster through the curing oven when exposed first to dielectric heating than was possible when dielectric heating and drying was not used. The strands 5, on leaving the hot gas oven 21, were susceptible of being readily handled and processed by winding, twisting, plying or weaving operations without sticking or blocking of the coated glass fibrous material.

The following rubber compound was reinforced with glass fibers that were sized, coated and processed as described above and the reinforcement was tested for "H" Adhesion in accordance with the aforementioned ASTM test D-2138-62T. The glass reinforcement used was cord of ECG-75 ⅝ construction. The chemical identification of the ingredients in the rubber compound can be found in "Materials and Compounding Ingredients of Rubber and Plastics," published by Rubber World.

| Ingredients: | SBR-natural rubber blend |
|---|---|
| SBR 1500 | 75 |
| No. 1 RSS (Ribbed smoked sheet) | 25 |
| HAF Black | 50 |
| ZnO | 5 |
| Stearic acid | 1 |
| Age-Rite resin (anti-oxidant) | 1 |
| Sundex 790 (plasticizer) | 10 |
| Santocure (accelerator) | 1 |
| DOTG | 0.2 |
| Sulfur | 2.0 |

"H-Adhesion" Test at 230° F. for 30 minutes (average 28 to 32 pounds).

The advantages that accrue from the practice of the present invention include: continuous and uninterrupted operation of the coating process, faster production speeds, improved process control, reduced operating and maintenance costs, reduced material waste and increased productivity. In addition, an improved product may also incidentally result from the practice of this invention, since the possibility of burning the coated strands by arcing is entirely eliminated.

The term "elastomer" as used herein and in the claims is intended to include elastic substances such as natural latex from the Hevea tree and synthetic rubber and rubber-like materials. It also includes natural and synthetic rubber and rubber-like materials which have been chemically modified such as by chlorination to improve their physical properties. Synthetic rubber includes rubber-like materials such as chloroprene, butadiene, isoprene and copolymers thereof with acrylonitrile, styrene and isobutylene. The term "elastomer" includes natural and synthetic rubber in the uncured or unvulcanized state as well as in the cured or vulcanized state.

While the term "glass fibers" is preferably employed to define continuous glass fibers as well as strands, yarns, cords and fabrics formed thereof, it is also within the contemplation of this invention to include within this term discontinuous, chopped or otherwise processed glass fibers, as well as strands, yarns, cords and fabrics formed thereof.

The term "high frequency electrical heating" as used herein is not intended to be limited solely to the disclosed use of what is commonly referred to as dielectric heating but rather is also intended to include all forms of high frequency electrical heating, including microwave heating, operating within the range of about 5 to about 3000 megacycles.

Although the present invention has been described with respect to specific details of certain embodiments thereof, it is not intended that such details act as limitations upon the scope of the invention except insofar as set forth in the accompanying claims.

I claim:

1. A method of producing an elastomer coated fiber glass strand comprising, moving a fiber glass strand impregnated with a liquid composition containing vaporizable components and a natural or synthetic rubber or rubberlike elastomer through a heating zone having electrodes for producing a field of high frequency energy and along a path extending through said field parallel thereto and adjacent to but spaced from said electrodes, said high frequency energy being sufficient to detach particles of said elastomer from said fiber glass strand while drying the coating composition thereon, passing from a supply source a barrier means continuously across a portion of said heating zone between said electrodes and said moving elastomer impregnated fiber glass strand, said barrier means having a surface opposed to but spaced from said strand, depositing and collecting upon said surface of said barrier means opposed to said moving strand elastomer particles which become detached from said fiber glass strand during the movement thereof through said heating zone to maintain said electrodes substantially free from said elastomer particles and removing the barrier means continuously from said heating zone and collecting it on a recovery means distinct from said supply source, said barrier means having a deposit of said elastomer particles detached from said fiber glass strand on said surface thereof opposed thereto from said heating zone to thereby avoid reducing the electrical gap between said strand and said electrodes due to build-up of elastomer particles on electrode surface portions or barrier surface portions adjacent to said strand.

2. Apparatus for drying fiber glass strand impregnated with a liquid composition containing vaporizable components and a natural or synthetic or rubberlike elastomer while moving said strand in a linear path through a heating zone comprising an oven having a wall surrounding the path of movement of said impregnated fiber glass strand, said oven being provided with openings in the ends thereof to permit the passage of strand through said oven, a plurality of electrodes positioned in said oven in side by side relationship and along the path of movement of said strand, said electrodes capable of producing a field of high frequency energy between adjacent electrodes and in the path of movement of said strand, means for moving said fiber glass strand through said oven at a rate sufficient to dry the coating composition thereon and along a path through said high frequency field and adjacent to but spaced from said electrodes, means to pass a movable barrier between said electrodes and said path of movement of said fiber glass strand, said barrier means having a surface adjacent to but spaced from the path of movement of said impregnated fiber glass strand to thereby collect any elastomer particles that becomes detached during movement through said oven, means to recover the barrier means from said oven at a location outside of said oven to thereby avoid reducing the electrical gap between said strand and said electrodes due to build-up of elastomer particles on electrode surfaces or barrier surfaces adjacent to said strand, said means to move barrier means into the oven and means to recover barrier means from the oven being physically separate and operatively associated such that the barrier means is fed and recovered continuously while strand is being dried in said oven.

3. A method of producing an elastomer coated fiber glass strand comprising, passing a fiber glass strand impregnated with a liquid composition containing vaporizable components and a natural or synthetic rubber or rubberlike elastomer through a heating zone having electrodes for producing a field of high frequency energy therein and along a path extending through said field, predominantly parallel thereto and adjacent to but spaced from said electrodes, said high frequency energy being sufficient to detach particles of said elastomer from said fiber glass strand while drying the coating composition thereon, passing a barrier means comprising an endless belt continuously through said heating zone between said electrodes and said moving elastomer impregnated fiber glass strand, said barrier means having a surface opposed to but spaced from said strand, depositing and collecting upon the surface of said barrier means opposed to said moving strand elastomer particles which become detached from said fiber glass strand during the movement of the barrier means through said heating zone to thereby maintain said electrodes substantially free from said elastomer particles, removing the barrier means surfaces having a deposit of said elastomer particles thereon continuously from said heating zone, passing the barrier means through a barrier means cleaning zone, heat treating the barrier means to remove any elastomer particles present thereon and returning the barrier means so treated to the fiber glass strand drying zone to thereby continuously provide a barrier means for said heating zone between the electrode and the strand to be dried which is capable of collecting any elastomer particles detached from the strand during drying.

4. Apparatus for drying fiber glass strand impregnated with a liquid composition containing vaporizable components and a natural or synthetic rubber or rubberlike elastomer while moving said strand in a linear path through a heating zone comprising, an oven having a wall surrounding the path of movement of said impregnated fiber glass strand, said oven being provided with opening in the ends thereof to permit passage of said strand through said oven, a plurality of electrodes positioned in said oven in side by side relationship and capable of producing a field of high frequency energy between adjacent electrodes and in the path of movement of said impregnated fiber glass strand, means for moving the fiber glass strand through said oven at a rate sufficient to dry the coating composition thereon and along a path through said high frequency field, a movable barrier means comprising an endless belt, said belt being constructed and arrange such that the barrier means passes through said heating zone between the electrodes and the path of movement of the strand to thereby prevent any elastomer detached from the strand from depositing on the electrodes, and means for heat cleaning the barrier means positioned between the barrier means outlet of the heating zone and the barrier means inlet to the heating zone.

References Cited
UNITED STATES PATENTS

| | | | |
|---|---|---|---|
| 2,460,566 | 2/1949 | Brown et al. | 219—10.61 X |
| 2,473,251 | 6/1949 | Hsu | 219—10.61 |
| 2,865,790 | 12/1958 | Baer | 117—93.1 DH |

MURRAY KATZ, Primary Examiner

J. H. NEWSOME, Assistant Examiner

U.S. Cl. X.R.
34—1; 117—126 GB